(12) United States Patent
Luo et al.

(10) Patent No.: US 11,127,540 B2
(45) Date of Patent: *Sep. 21, 2021

(54) ENERGY STORAGE DEVICE

(71) Applicants: Tsinghua University, Beijing (CN); HON HAI PRECISION INDUSTRY CO., LTD., New Taipei (TW)

(72) Inventors: Zhi-Ling Luo, Beijing (CN); Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,234

(22) Filed: May 11, 2020

(65) Prior Publication Data

US 2020/0388444 A1    Dec. 10, 2020

(30) Foreign Application Priority Data

May 17, 2019   (CN) .......................... 201910413405.0

(51) Int. Cl.
  *H01G 11/30*   (2013.01)
  *H01G 11/36*   (2013.01)
  *H01G 11/54*   (2013.01)

(52) U.S. Cl.
  CPC ............. *H01G 11/36* (2013.01); *H01G 11/30* (2013.01); *H01G 11/54* (2013.01)

(58) Field of Classification Search
  CPC .......... H01G 11/36; H01G 11/30; H01G 11/54
  See application file for complete search history.

(56) References Cited

U.S. PATENT DOCUMENTS

| | | | | |
|---|---|---|---|---|
| 9,780,291 | B2* | 10/2017 | Wang | H01M 10/425 |
| 2003/0035982 | A1* | 2/2003 | Ryu | H01M 14/00 |
| | | | | 429/7 |
| 2011/0090621 | A1* | 4/2011 | Chacko | H01G 9/0425 |
| | | | | 361/523 |
| 2011/0198558 | A1* | 8/2011 | Okai | H01L 29/7781 |
| | | | | 257/9 |
| 2012/0140378 | A1* | 6/2012 | Tan | H01M 4/90 |
| | | | | 361/500 |
| 2012/0171574 | A1* | 7/2012 | Zhamu | H01M 4/364 |
| | | | | 429/300 |
| 2016/0285137 | A1* | 9/2016 | Gayden | H01G 11/28 |
| 2016/0293954 | A1* | 10/2016 | Zhamu | H01G 11/62 |
| 2019/0295781 | A1* | 9/2019 | Yde-Andersen | H01G 11/08 |
| 2020/0234890 | A1* | 7/2020 | Luo | H01G 11/04 |

(Continued)

*Primary Examiner* — Dion Ferguson
(74) *Attorney, Agent, or Firm* — ScienBiziP, P.C.

(57) ABSTRACT

An energy storage device is provided which includes a supercapacitor first electrode, a supercapacitor second electrode, a first electrolyte, a metal electrode, and a hydrophobic layer. The supercapacitor first electrode, the supercapacitor second electrode, and the first electrolyte together form a supercapacitor. The metal electrode is spaced apart from the supercapacitor first electrode to form a first gap, the metal electrode and the supercapacitor second electrode form an Ohmic contact. The hydrophobic layer is located on at least one portion of a surface of the supercapacitor first electrode and/or at least one portion of a surface of the supercapacitor second electrode.

18 Claims, 9 Drawing Sheets

(56) References Cited

U.S. PATENT DOCUMENTS

2020/0234891 A1\* 7/2020 Luo .................. H01G 11/36
2020/0234892 A1\* 7/2020 Luo .................. H01G 11/36
2020/0365336 A1\* 11/2020 Luo ................ H01M 50/489

\* cited by examiner

ENERGY STORAGE DEVICE

FIELD

The present disclosure relates to the field of energy storage.

BACKGROUND

Supercapacitors are promising energy storage devices with a capacitance value much higher than other capacitors, but with lower voltage limits. However, supercapacitors can only store but not harvest energy.

What is needed, therefore, is an energy storage device which can both harvest and store energy.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
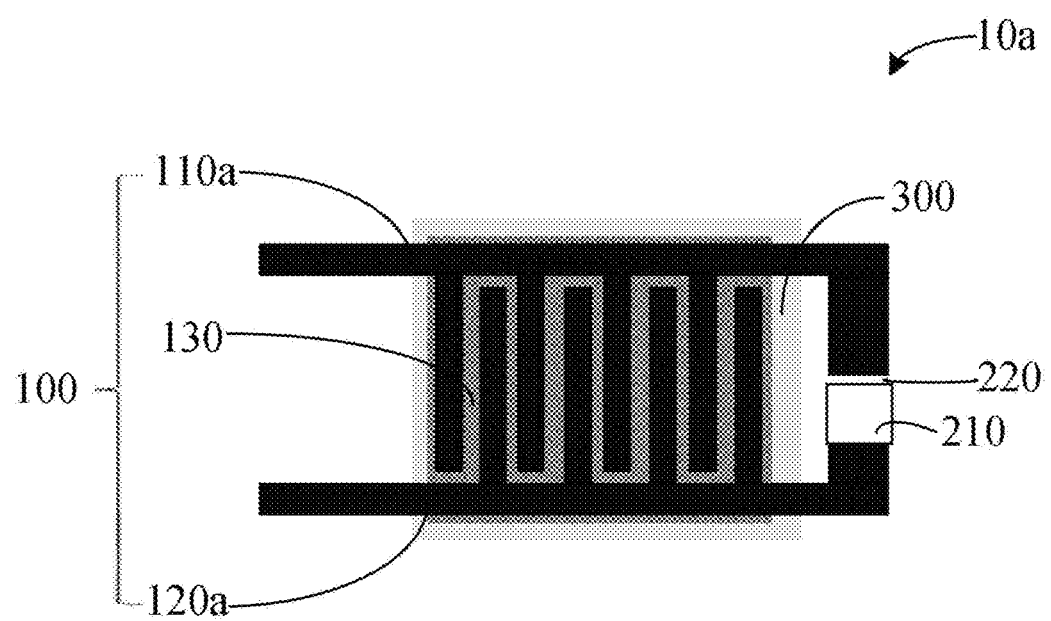
FIG. 1 is a top view of one embodiment of an energy storage device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to be better illustrate details and features. The description is not to be considered as limiting the scope of the embodiments described herein.

Several definitions that apply throughout this disclosure will now be presented.

The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 shows an embodiment of an energy storage device 10a. The energy storage device 10a includes a supercapacitor 100, a metal electrode 210, and a hydrophobic layer 300.

The supercapacitor 100 includes a supercapacitor first electrode 110a, a supercapacitor second electrode 120a, and a first electrolyte 130. A portion of the supercapacitor 100 is covered by the hydrophobic layer 300.

In one embodiment, the supercapacitor 100 is an interdigital capacitor, and the supercapacitor first electrode 110a and the supercapacitor second electrode 120a are both interdigital electrodes. The supercapacitor first electrode 110a and the supercapacitor second electrode 120a are spaced from and staggered with each other.

Figure 2:
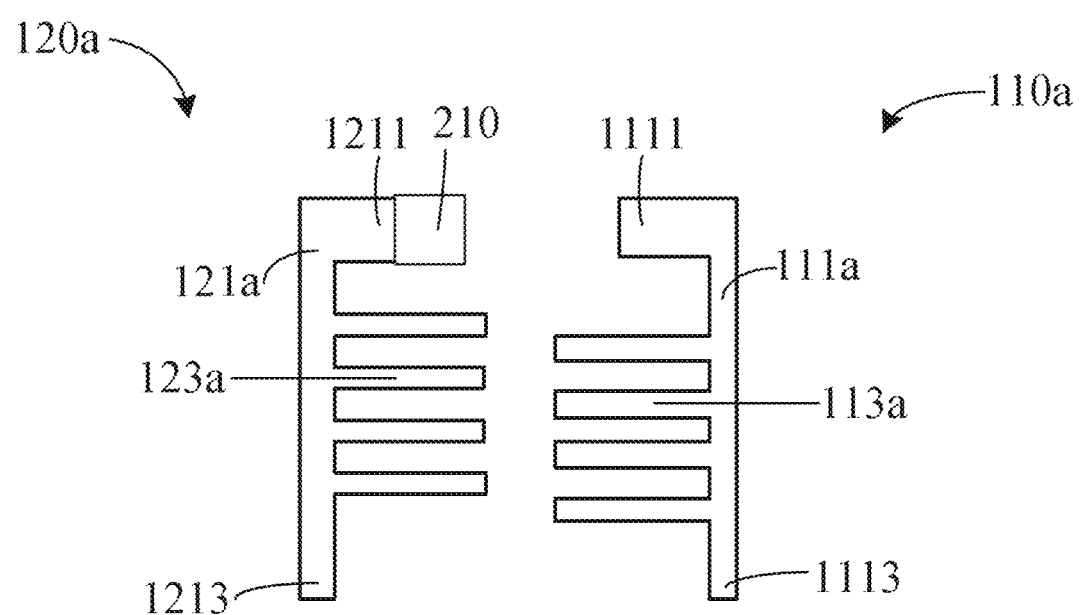
FIG. 2 is a structural schematic view of one embodiment of the energy storage device.

Referring to FIG. 2, the supercapacitor first electrode 110a includes a first connection part 111a and a plurality of first interdigital parts 113a. The plurality of first interdigital parts 113a is substantially parallel to and spaced apart from each other. The plurality of first interdigital parts 113a is connected to the first connection part 111a. The first connection part 111a includes a first end 1111 and a second end 1113 opposite to the first end 1111. The first end 1111 is spaced apart from the metal electrode 210 to form a first gap 220 (shown in FIG. 1). The second end 1113 is used as a pin for external connection.

The supercapacitor second electrode 120a includes a second connection part 121a and a plurality of second interdigital parts 123a. The plurality of second interdigital parts 123a is substantially parallel to and spaced apart from each other. The plurality of second interdigital parts 123a is connected to the second connection part 121a. The second connection part 121a includes a first end 1211 and a second end 1213 opposite to the first end 1211. The first end 1211 is Ohmic contacted with the metal electrode 210. In one embodiment, a conductive adhesive (e.g. silver paste) is located between the metal electrode 210 and the first end 1211. The second end 1213 is used as a pin for external connection.

The metal electrode 210 is configured as a negative electrode of a metal-air cell, and the supercapacitor first electrode 110 is configured as a positive electrode of the metal-air cell.

The plurality of first interdigital parts 113a and the plurality of second interdigital parts 123a are staggered and spaced from each other. There is a distance between the adjacent first interdigital parts 113a and the second interdigital parts 123a.

The first electrolyte 130 is filled in the gaps of the plurality of first interdigital parts 113a and the plurality of second interdigital parts 123a. The first electrolyte 130 may be a supercapacitor electrolyte, such as a polyvinyl alcohol/$H_2SO_4$ (PVA/$H_2SO_4$) gel electrolyte.

Figure 3:
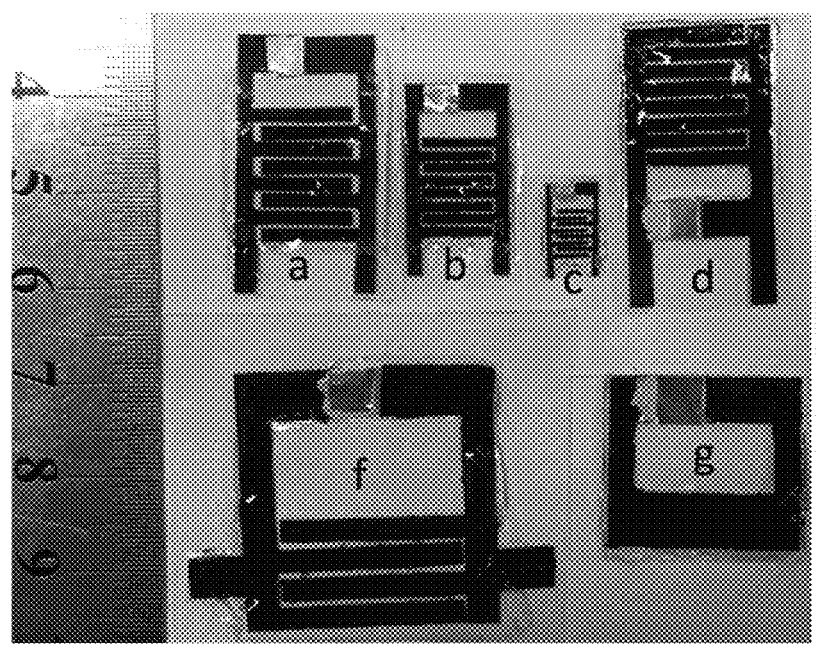
FIG. 3 is a photo of the energy storage devices of one embodiment.

FIG. 3 shows photos of the energy storage device 10a. There are different shapes and sizes of the energy storage device 10a in FIG. 3.

In one embodiment, each of the supercapacitor first electrode 110a and the supercapacitor second electrode 120a includes a carbon nanotube/polyaniline (CNT/PANI) composite film.

The CNT/PANI composite film includes a carbon nanotube network structure and a polyaniline layer. The carbon nanotube network structure includes a plurality of carbon nanotubes combined by van der Waals attractive force therebetween and forming a free-standing film network. The term "free-standing" includes, but is not limited to, a structure that does not have to be supported by a substrate and can sustain its own weight when it is hoisted by a portion of the structure without any significant damage to its structural integrity. The free-standing property is achieved only due to the van der Waals attractive force between adjacent carbon nanotubes. The carbon nanotube network structure includes a plurality of micropores defined by the adjacent carbon nanotubes. A size of the plurality of micropores may be in a range from about 60 nm to about 400 nm.

The polyaniline layer is coated on a surface of the carbon nanotube network structure. The polyaniline layer wraps around the plurality of carbon nanotubes. The carbon nanotube network structure serves as the core and the template to support the polyaniline layer. The CNT/PANI composite film is thin, light-weight, and flexible because of the plurality of carbon nanotubes and micropores.

The first end 1111 also serves as a negative region of a metal-air battery. The negative region and the metal electrode 210 together form the first gap 220.

When the first gap 220 is filled with a second electrolyte 20, and the metal electrode 210 and the supercapacitor first electrode 110a are electrically conducted by the second electrolyte 20, the energy storage device 10a is in a self-charging mode, the metal-air battery outputs power to charge the supercapacitor 100.

When the first gap 220 is not filled with the second electrolyte 20, such that the metal electrode 210 and the supercapacitor first electrode 110a cannot be electrically conducted by the second electrolyte 20, the energy storage device 10a is in a non-self-charging mode, the metal-air battery does not output power.

The energy storage device 10a can switch between the self-charging mode and the non-self-charging mode by controlling the second electrolyte 20. The second electrolyte 20 can be applied between the metal electrode 210 and the supercapacitor first electrode 110a by touching or pressing. The second electrolyte 20 can be applied by a finger or a swab. The second electrolyte 20 can be sweat or a NaCl solution.

The material of the metal electrode 210 can be magnesium, aluminum, zinc, iron, or the like. In one embodiment, the metal electrode 210 is an aluminum foil with a thickness in a range from about 30 μm to about 80 μm.

The hydrophobic layer 300 is located on at least one portion of a surface of the supercapacitor first electrode 110a and/or at least one portion of a surface of the supercapacitor second electrode 120a. A contact angle of the hydrophobic layer 300 is greater than 90 degrees. In one embodiment, the material of the hydrophobic layer 300 is silicone rubber.

The supercapacitor first electrode 110a includes a first surface and a second surface opposite to the first surface. The second electrolyte 20 flows from the first surface to the second surface under its own gravity, and the hydrophobic layer 300 is located on the second surface. Similarly, the supercapacitor second electrode 120a includes a third surface and a fourth surface opposite to the third surface. The second electrolyte 20 flows from the third surface to the fourth surface under its own gravity, and the hydrophobic layer 300 is located on the fourth surface.

Figure 4:
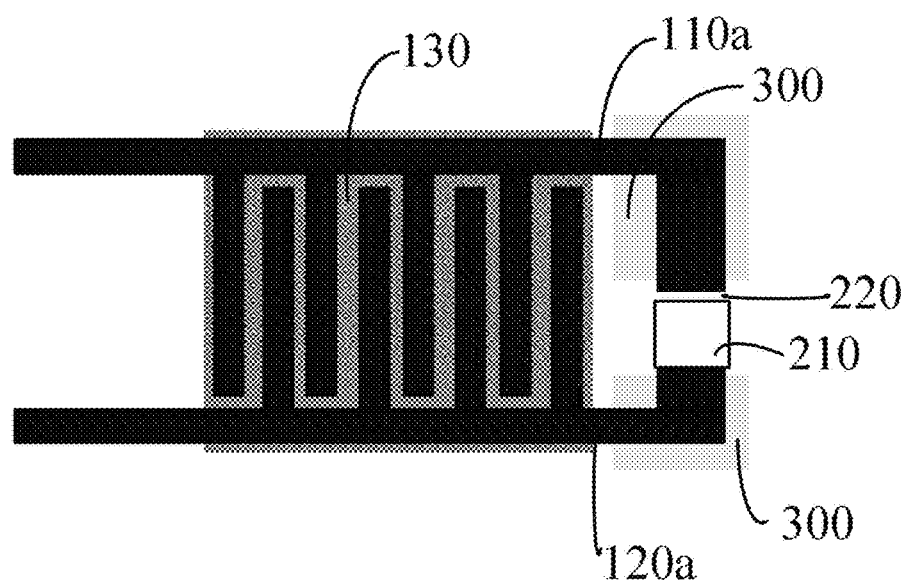
FIG. 4 is a schematic view of one embodiment of a hydrophobic layer.
Figure 5:
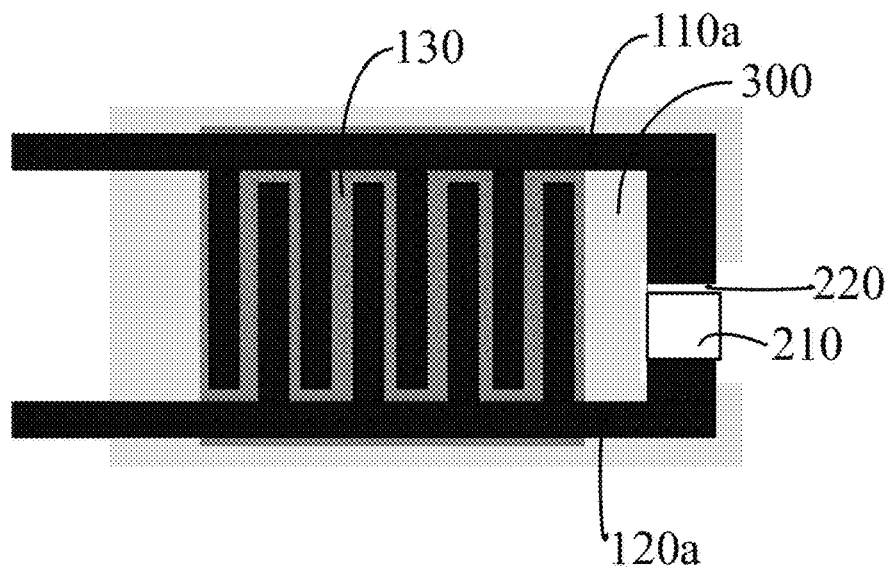
FIG. 5 is a schematic view of one embodiment of the hydrophobic layer.

In FIG. 4, the hydrophobic layer 300 is located on the second surface adjacent to the first gap 220 and the fourth surface adjacent to the first gap 220, respectively. The area of the hydrophobic layer 300 may be further enlarged. In FIG. 5, the hydrophobic layer 300 is located on the whole second surface and fourth surface except the pins. The hydrophobic layer 300 may be further located on the first surface and/or the third surface, and even covers the supercapacitor first electrode 110a and the supercapacitor second electrode 120a, just leaving the two pins exposed.

In FIGS. 1, 4, and 5, the hydrophobic layer 300 does not extend to the end of the supercapacitor first electrode 110a. In one embodiment, the hydrophobic layer 300 may extend to the end of the supercapacitor first electrode 110a, just leaving part of the supercapacitor first electrode 110a exposed.

Figure 6:
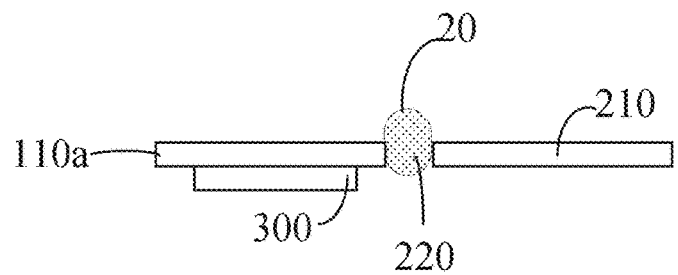
FIG. 6 is a schematic view of positional relationships of the hydrophobic layer and a supercapacitor first electrode.
Figure 6:
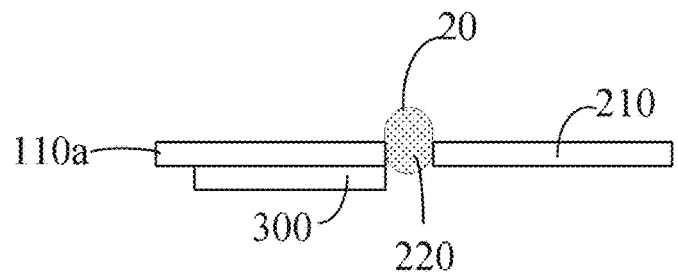
Figure 6:
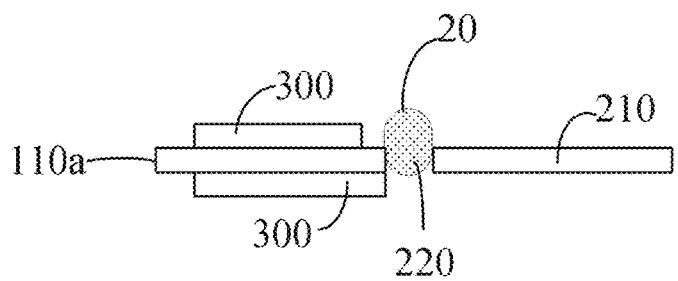
Figure 6:
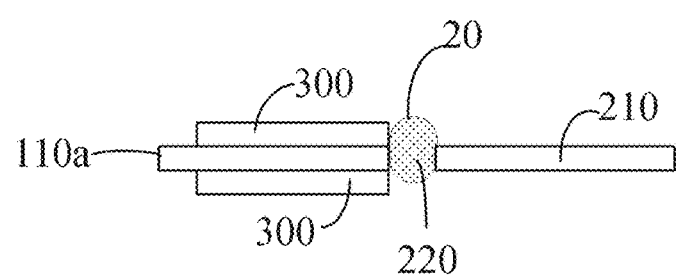
Figure 6:
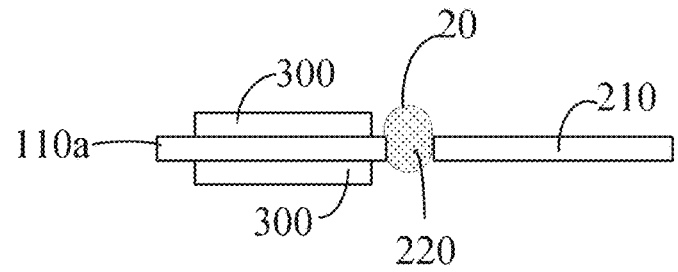

FIG. 6 shows several positional relationships between the hydrophobic layer 300 and the supercapacitor first electrode 110a. The hydrophobic layer 300 located on the first surface may extend completely to the end of the supercapacitor first electrode 110a, or extend to a distance from the end (such as 1 mm~10 mm). Similarly, the hydrophobic layer 300 located on the second surface may extend completely to the end of the supercapacitor first electrode 110a, or extend to a distance from the end (such as 1 mm~10 mm).

The hydrophobic layer 300 may maintain the second electrolyte 20 in the first gap 220 for a long time, then increase the working time of the energy storage device 10a.

Figure 7:
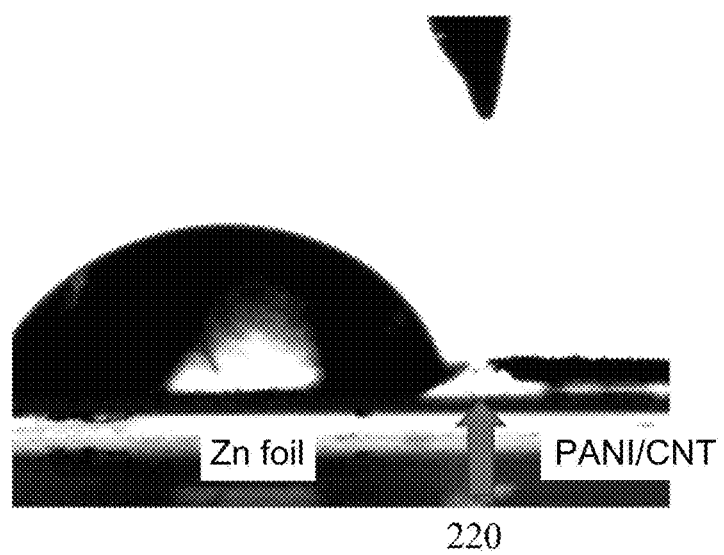
FIG. 7 is a photo of the distribution of a second electrolyte without the hydrophobic layer.

Referring to FIG. 7, the CNT/PANI composite film does not cover the hydrophobic layer 300, and the arrow indicates the first gap 220. The second electrolyte 20 dripping over the first gap 220 is more likely to accumulate on the side of the zinc foil. Then the second electrolyte 20 cannot well electrically connect the metal electrode 210 and the supercapacitor first electrode 110a, thus the metal-air battery is difficult to work continuously and stably.

The reason is that the second electrolyte 20 cannot effectively accumulate at the first gap 220. Even though the metal electrode 210 and the supercapacitor first electrode 110a are electrically connected, as time goes on, the volume of the second electrolyte 20 gradually decreases, and the metal electrode 210 and supercapacitor first electrode 110a are no longer conductive, thus the metal-air battery stops working.

Figure 8:
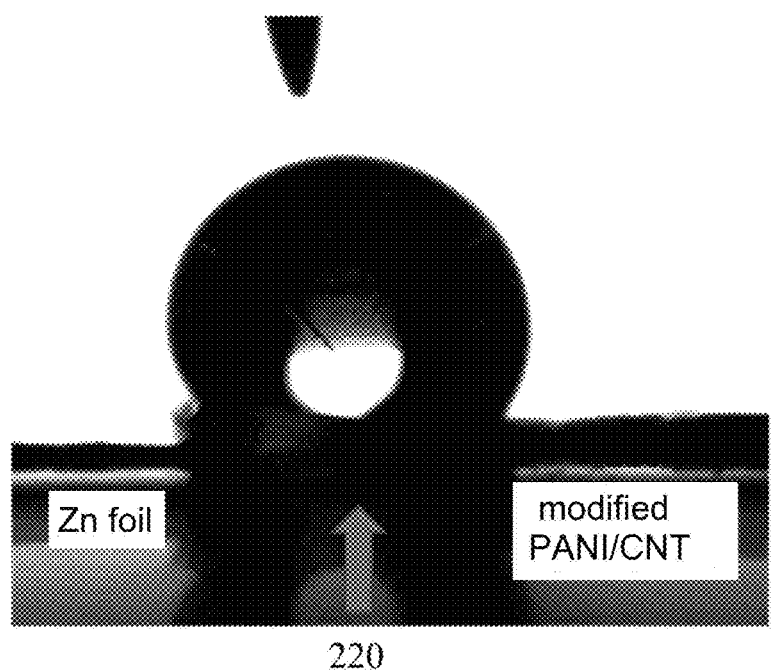
FIG. 8 is a photo of the distribution of the second electrolyte with the hydrophobic layer.
Figure 9:
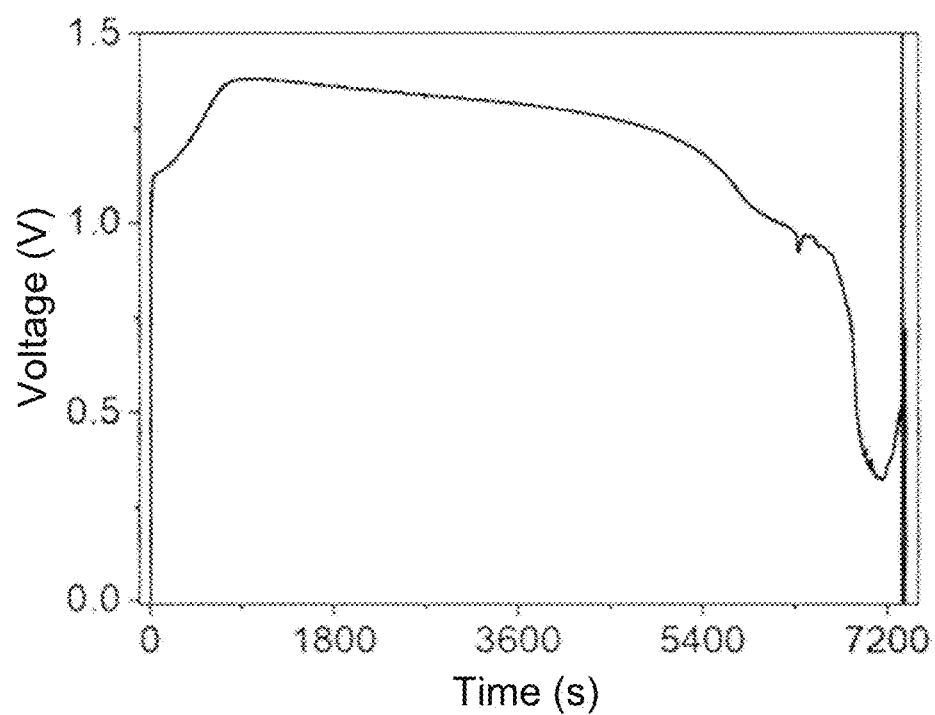
FIG. 9 is a voltage-time curve of a metal-air battery in the energy storage device.

In FIG. 8, the lower surface of the CNT/PANI composite film covers the hydrophobic layer 300. The second electrolyte 20 dripping over the first gap 220 is more likely to accumulate at the first gap 220. In this case, the metal-air battery can work continuously and stably. Referring to FIG. 9, the energy storage device 10a can continue to work for more than 100 minutes without supplementing the second electrolyte 20, and the voltage is greater than 1V, the reason is that the second electrolyte 20 can effectively accumulate at the first gap 220.

The energy storage device 10a can continuously and stably output electrical energy without adding metal-air battery electrolyte. The energy storage device 10a can be used as an energy supply device for wearable electronic products.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. An energy storage device, comprising: a supercapacitor first electrode, a supercapacitor second electrode, a first electrolyte, a metal electrode, and a hydrophobic layer; wherein:
    the supercapacitor first electrode, the supercapacitor second electrode, and the first electrolyte together form a supercapacitor;
    the metal electrode is spaced apart from the supercapacitor first electrode to form a first gap, and the metal electrode and the supercapacitor second electrode form an Ohmic contact; and
    the hydrophobic layer is located on at least one portion of a surface of the supercapacitor first electrode and/or at least one portion of a surface of the supercapacitor second electrode.

2. The energy storage device of claim 1, wherein the metal electrode is configured as a negative electrode of a metal-air cell, and the supercapacitor first electrode is configured as a positive electrode of the metal-air cell.

3. The energy storage device of claim 1, wherein the first gap is configured to accommodate a second electrolyte.

4. The energy storage device of claim 3, wherein the second electrolyte is configured to electrically conduct the metal electrode and the supercapacitor first electrode.

5. The energy storage device of claim 3, wherein the second electrolyte is sweat.

6. The energy storage device of claim 1, wherein the first electrolyte is spaced apart from the metal electrode.

7. The energy storage device of claim 1, wherein a material of the metal electrode is selected from the group consisting of magnesium, aluminum, zinc, and iron.

8. The energy storage device of claim 1, wherein a thickness of the metal electrode is in a range from about 25 µm to about 100 µm.

9. The energy storage device of claim 1, wherein the supercapacitor first electrode is a carbon nanotube/polyaniline composite film.

10. The energy storage device of claim 9, wherein the carbon nanotube/polyaniline composite film comprises a carbon nanotube network structure and a polyaniline layer.

11. The energy storage device of claim 10, wherein the carbon nanotube network structure is a free-standing film network and comprises a plurality of carbon nanotubes combined by van der Waals attractive force therebetween.

12. The energy storage device of claim 11, wherein the carbon nanotube network structure comprises a plurality of micropores defined by the plurality of carbon nanotubes.

13. The energy storage device of claim 1, wherein a conductive adhesive is located between the metal electrode and the supercapacitor second electrode.

14. The energy storage device of claim 13, wherein the conductive adhesive is silver paste.

15. The energy storage device of claim 1, wherein the supercapacitor first electrode comprises a first surface and a second surface opposite to the first surface, and the hydrophobic layer is located on the second surface adjacent to the first gap.

16. The energy storage device of claim 1, wherein the supercapacitor second electrode comprises a third surface and a fourth surface opposite to the third surface, and the hydrophobic layer is located on the fourth surface adjacent to the first gap.

17. The energy storage device of claim 1, wherein a contact angle of the hydrophobic layer is greater than 90 degrees.

18. The energy storage device of claim 1, wherein a material of the hydrophobic layer is silicone rubber.

\* \* \* \* \*